US 7,372,231 B2

(12) United States Patent
Sako

(10) Patent No.: US 7,372,231 B2
(45) Date of Patent: May 13, 2008

(54) MOVABLE BODY POSITION CONTROL DEVICE AND STAGE DEVICE USING THE MOVABLE BODY POSITION CONTROL DEVICE

(75) Inventor: Daisuke Sako, Tokorozawa (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 23 days.

(21) Appl. No.: 11/581,568

(22) Filed: Oct. 17, 2006

(65) Prior Publication Data

US 2007/0035266 A1 Feb. 15, 2007

Related U.S. Application Data

(63) Continuation of application No. PCT/JP2005/008367, filed on May 6, 2005.

(30) Foreign Application Priority Data

May 19, 2004 (JP) ............................. 2004-149651

(51) Int. Cl.
*G05B 5/01* (2006.01)
(52) U.S. Cl. ...................... 318/649; 318/623; 318/632
(58) Field of Classification Search ................ 318/561, 318/586, 628, 649, 652, 687, 611, 621, 623, 318/632
See application file for complete search history.

(56) References Cited

U.S. PATENT DOCUMENTS

| 6,584,367 | B1 * | 6/2003 | Makino et al. ............... 700/60 |
| 6,844,694 | B2 * | 1/2005 | Binnard ...................... 318/649 |
| 6,927,838 | B2 * | 8/2005 | Ono et al. .................... 355/72 |

| 2003/0030402 | A1 * | 2/2003 | Binnard ...................... 318/649 |

FOREIGN PATENT DOCUMENTS

| JP | 05-308044 | 11/1993 |
| JP | 06-095744 | 4/1994 |
| JP | 08-331879 | 12/1996 |
| JP | 09-238489 | 9/1997 |

(Continued)

*Primary Examiner*—Long Nguyen
*Assistant Examiner*—Thai T Dinh
(74) *Attorney, Agent, or Firm*—Squire, Sanders & Dempsey L.L.P.

(57) ABSTRACT

A movable body position control device includes a pair of position detectors configured to detect moving positions of both ends of a movable body; a pair of driving parts, the driving parts being configured to drive the both ends of the movable body based on a detection signal from the pair of the position detectors; a translation control part configured to make the driving parts can generate a driving force whereby a difference of translational action of the movable body can be prevented in a case where a moving speed of the movable body is changed due to a disturbance, and configured to control the driving parts so that detected positions of the position detectors can be consistent with each other; and a rotation control part configured to make the driving parts can generate the driving force whereby a rotational action of the movable body can be prevented in a case where the moving speed of the movable body is changed due to the disturbance and the movable body is displaced in a rotational direction, and configured to control the driving parts so that the moving body does not lean against a moving direction.

13 Claims, 5 Drawing Sheets

FOREIGN PATENT DOCUMENTS

| | | |
|---|---|---|
| JP | 10-277771 | 10/1998 |
| JP | 2000-214280 | 8/2000 |
| JP | 2000-330642 | 11/2000 |
| JP | 2001-22448 | 1/2001 |
| JP | 2002-049425 | 2/2002 |
| JP | 2002-200450 | 7/2002 |

* cited by examiner

MOVABLE BODY POSITION CONTROL DEVICE AND STAGE DEVICE USING THE MOVABLE BODY POSITION CONTROL DEVICE

CROSS-REFERENCE TO RELATED APPLICATION

This application is a U.S. continuation application filed under 35 USC 111(a) claiming benefit under 35 USC 120 and 365(c) of PCT application JP05/008367, filed May 6, 2005, which claims priority to Application Ser. No. 2004-149651, filed in Japan on May 19, 2004. The foregoing applications are hereby incorporated herein by reference.

BACKGROUND OF THE INVENTION

1. Field of the Invention

The present invention generally relates to movable body position control devices and stage devices using the movable body position control devices. More particularly, the present invention relates to a movable body position control device and stage device using the movable body position control device whereby rotational action of a movable body and change of a moving speed due to disturbance when both ends of the movable body (stage) are translated in a single direction are prevented.

2. Description of the Related Art

Movable body position control devices configured to control positions of movable bodies are provided to devices called stage devices, for example. Furthermore, there is a gantry moving type stage device in these devices. In this gantry moving type stage device, a gate type movable body (Y stage) moves above a substrate held on a table at a constant speed. See, for example, Japanese Laid-Open Patent Application Publication No. 2002-200450.

In addition, the above-mentioned movable body (Y stage) is extended in a direction (X direction) perpendicular to a moving direction (Y direction). Both end parts of the movable body (Y stage) are movably supported by a pair of a guide members as the movable body (Y stage) straddles the substrate. A moving position of the movable body (Y stage) is detected by a pair of linear scales (position detector). The both end parts of the movable body are driven in the moving direction by a pair of linear motors (driving part).

Corresponding to demands of users, various jigs such as a coating nozzle configured to coat chemical liquid on a surface of the substrate or a sensor configured to inspect the surface of the substrate are installed in the movable body (Y stage). Thus, the movable body (Y stage) is required to have a stable moving speed or moving control with higher precision.

Because of this, the pair of the linear motors is controlled by a feed back system control device configured to simultaneously control driving forces of two points so that the movable body moves at a constant speed based on a detection signal from the pair of the linear scales.

In the related art device, while the moving position of the movable body (Y stage) is detected by the pair of the linear scales, the driving force is controlled by the pair of the linear motors. In this case, various disturbances are input to the movable body. As a result of this, the moving speeds of the both end parts of the movable body are not constant because of vibration or change of a load due to the disturbance, and the movable body leans against a direction perpendicular to the moving direction so that a rotational force whose center is an axis in a direction perpendicular to the movable body is generated.

For example, a torque change (torque ripple) of the linear motor, a load change of a cable bearing configured to guide a cable connected to a coil of the linear motor provided to the movable body, vibration transmitted from a floor, or the like may correspond to the disturbance being input to the movable body. Therefore, the disturbance is not always input to the both end parts of the movable body. Depending on conditions such as the moving speed or the moving position, the load being input or the vibration may be changed.

In a case where such a disturbance is input, it is difficult to stabilize the moving speed that is changed due to the disturbance at a moment by the feed back control. It takes time to attenuate the change due to the disturbance. Therefore, it is difficult to make highly precise movements of the movable body to achieve such as film thickness precision applied by the coating nozzle or sensing precision of the sensor.

In addition, as a driving force control method for controlling the change due to the disturbance, development of a control device using a disturbance observer (disturbance state observer) is now under development. However, in a case of the method for estimating the disturbance so that a translational action (movement) of the movable body is controlled, for example, if the rotational force is applied to the movable body due to change of the load or the like so that the movable body leans, the movable body may be translated even in the state where the movable body leans.

SUMMARY OF THE INVENTION

Accordingly, embodiments of the present invention can provide a novel and useful movable body position control device and stage device using the movable body position control device, in which one or more of the problems described above are eliminated.

More specifically, the embodiments of the present invention can provide a movable body position control device and stage device using the movable body position control device whereby a driving force can be generated so that a difference in translational actions of a movable body can be prevented.

The embodiments of the present invention can also provide a movable body position control device including a pair of position detectors configured to detect moving positions of both ends of a movable body; a pair of driving parts, the driving parts being configured to drive the both ends of the movable body based on a detection signal from the pair of the position detectors; a translation control part configured to make the driving parts can generate a driving force whereby a difference of translational action of the movable body can be prevented in a case where a moving speed of the movable body is changed due to a disturbance, and configured to control the driving parts so that detected positions of the position detectors can be consistent with each other; and a rotation control part configured to make the driving parts can generate the driving force whereby a rotational action of the movable body can be prevented in a case where the moving speed of the movable body is changed due to the disturbance and the movable body is displaced in a rotational direction, and configured to control the driving parts so that the moving body does not lean against a moving direction.

The embodiments of the present invention can also provide a stage device, including: a fixed base; a stage movably provided against the fixed base and extending in a direction perpendicular to a moving direction; a guide part configured to guide both ends of the stage in the moving direction; a pair of driving parts configured to give a driving force to the both ends of the stage; a pair of position detectors configured to detect moving positions of the both ends of the stage; and a control part configured to control the driving parts so that the stage can move at a designated speed; wherein the control part can include a translation control part configured to make the driving parts can generate a driving force whereby a difference of translation actions of the stage can be prevented in a case where a moving speed of the stage is changed due to a disturbance, and configured to control the driving parts so that detected positions of the position detectors are consistent with each other; and a rotation control part configured to make the driving parts can generate a driving force whereby a rotational action of the stage can be prevented in a case where the moving speed of the stage is changed due to the disturbance and the stage is displaced in a rotational direction, and configured to control the driving parts so that the stage does not lean against a moving direction.

According to the above-mentioned movable body position control device and stage device using the movable body position control device, a driving force can be generated so that a difference of translational actions of a movable body can be prevented.

Other objects, features, and advantages of the present invention will become more apparent from the following detailed description when read in conjunction with the accompanying drawings.

DETAILED DESCRIPTION OF THE PREFERRED EMBODIMENT

A description will now be given, with reference to FIG. 1 through FIG. 6, of embodiments of the present invention.

[First example of the present invention]

Figure 1:
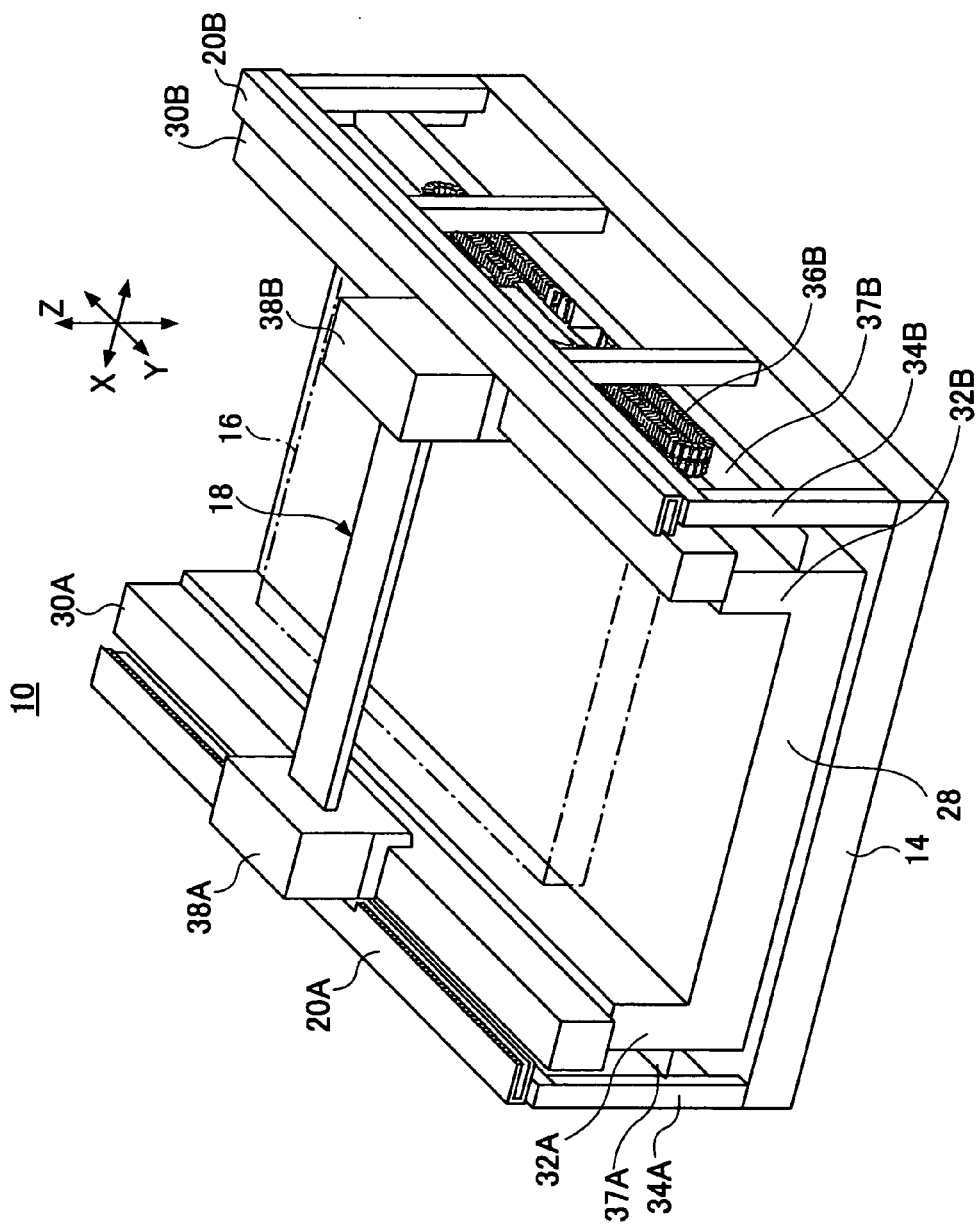
FIG. 1 is a perspective view of a stage device where a movable body position control device of an embodiment of the present invention is applied.
Figure 2:
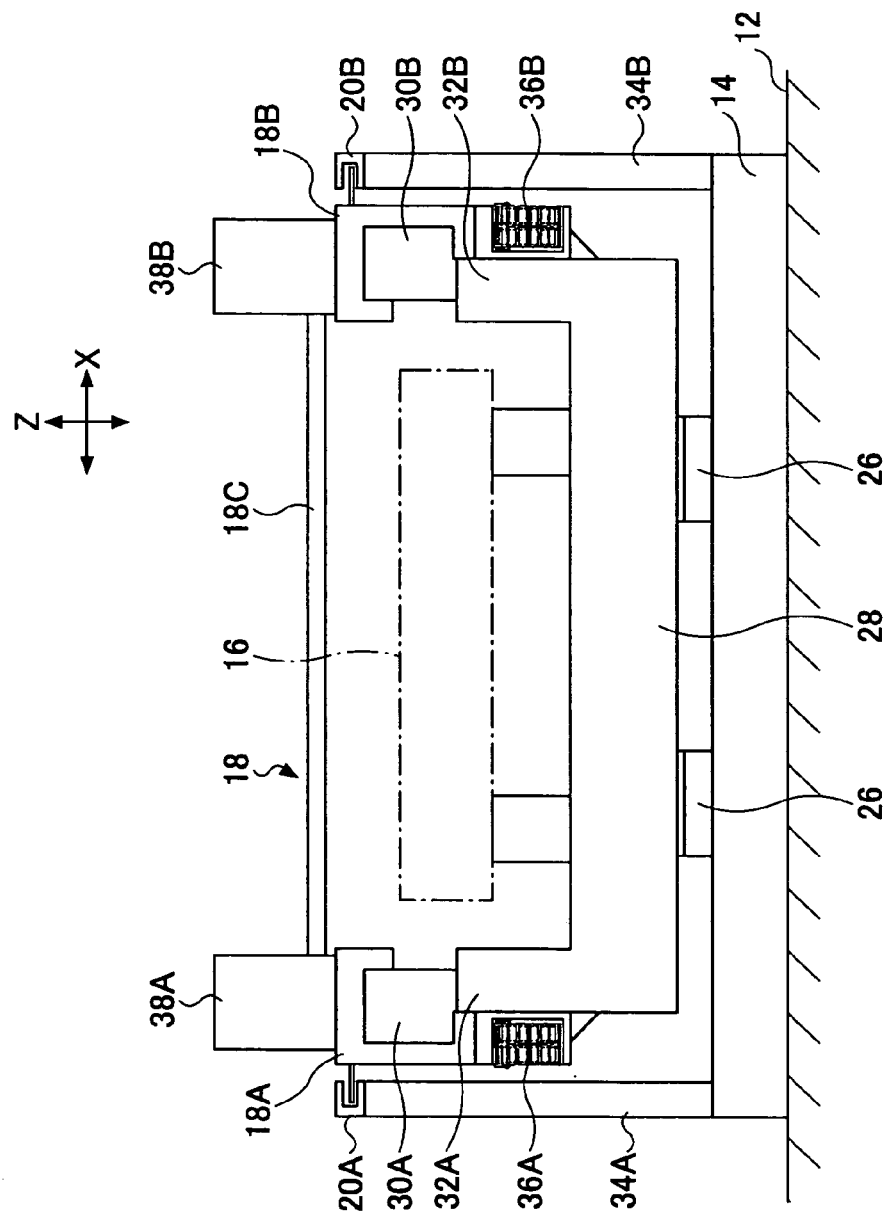
FIG. 2 is a front view of the stage device shown in FIG. 1.
Figure 3:
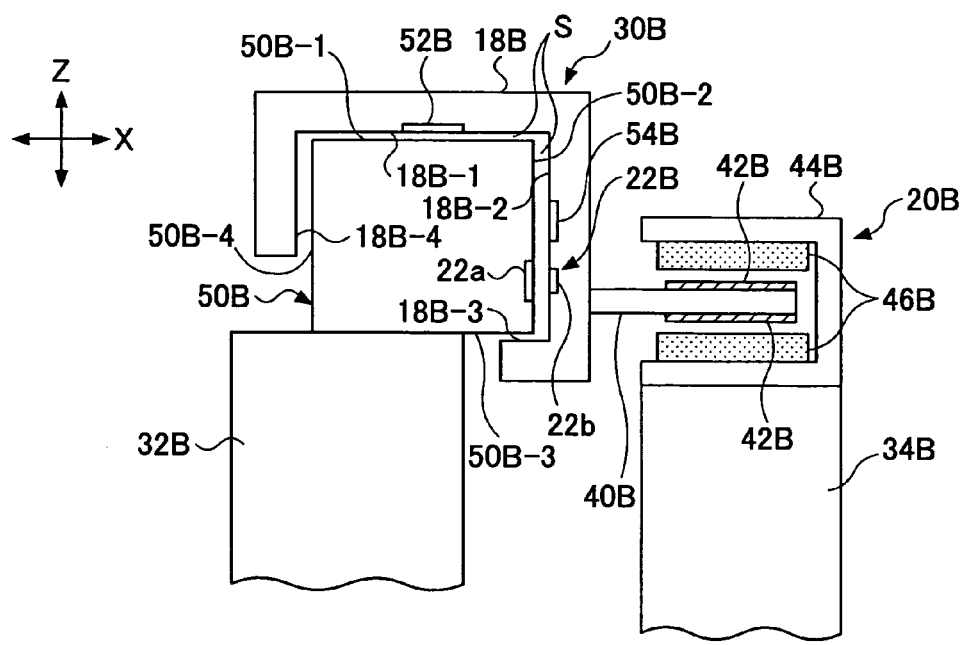
FIG. 3 is an enlarged front view of a structure of a linear motor 20B and a guide part 30B.
Figure 4:
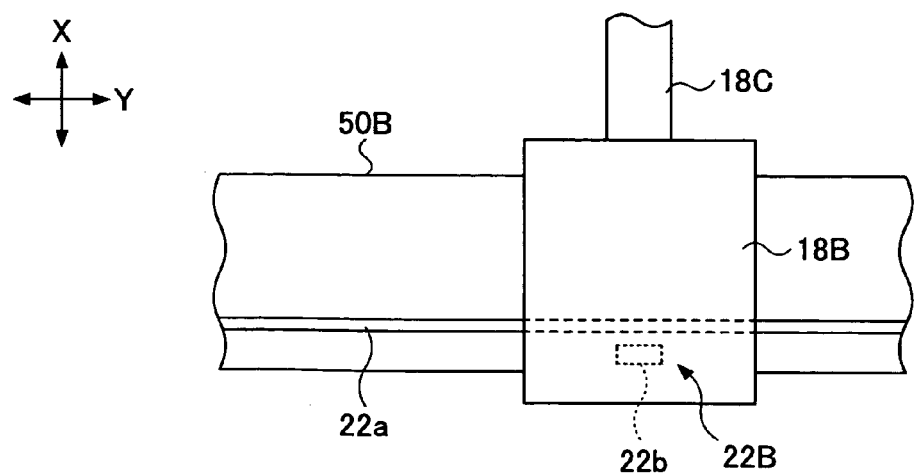
FIG. 4 is an enlarged plan view of the structure of the linear motor 20B and the guide part 30B.

FIG. 1 is a perspective view of a stage device where a movable body position control device of an embodiment of the present invention is applied. FIG. 2 is a front view of the stage device shown in FIG. 1. FIG. 3 is an enlarged front view of a structure of a linear motor 20B and a guide part 30B. FIG. 4 is an enlarged plan view of the structure of the linear motor 20B and the guide part 30B.

As shown in FIG. 1 through FIG. 4, a stage device 10 is a gantry moving type stage. The stage device 10 includes a fixed base 14, a substrate table 16, a movable stage 18, a pair of linear motors 20A and 20B (See FIG. 2) as a driving part, and linear scales 22A and 22B (See FIG. 3) as a position detector. The fixed base 14 is fixed on a concrete base 12. The substrate table 16 is supported on the fixed base 14. The movable stage 18 forms a bridge so as to straddle the substrate table 16. The linear motors 20A and 20B drive corresponding end parts of the movable stage 18 in a Y direction. Moving positions of the both end parts of the movable stage 18 are detected by the corresponding linear scales 22A and 22B. Since the linear scale 22A has the same structure as that of the liner scale 22B, illustrations of the linear scales 22A are omitted in FIG. 3 and FIG. 4.

The fixed base 14 has a firm lattice structure of reinforcing steels. The fixed base 14 is fixed to the base 12 via plural fixing members (not shown in FIG. 1 through FIG. 4). A vibration absorption unit 26 is provided on an upper surface of the fixed base 14 so as to absorb vibration. A stone platen 28 is provided at an upper part of the vibration absorption unit 26. The stone platen 28 is made of a high-strength stone having a coefficient of thermal expansion smaller than that of a metal such as iron.

The substrate table 16 is fixed to an upper surface of the stone platen 28 so as to be stable. In addition, a vacuum suction part (not shown in FIG. 1 through FIG. 4) is provided on the upper surface of the substrate table 16 so as to hold a substrate such as a liquid crystal substrate as a work piece.

Guide supporting parts 32A and 32B stand at left and right sides of the stone platen 28 so as to support the guide parts 30A and 30B, respectively. The guide parts 30A and 30B are provided so as to be extended in the Y direction that is a moving direction of the movable stage 18. The guide parts 30A and 30B have static pressure air bearings configured to guide both end parts of the movable stage 18 with low friction.

In addition, motor supporting parts 34A and 34B stand outside the guide supporting parts 32A and 32B so as to support the linear motors 20A and 20B, respectively. The motor supporting parts 34A and 34B are fixed to the fixed base 14 and extended in the Y direction that is the moving direction of the movable stage 18.

Cable bearings 36A and 36B are provided between the guide supporting parts 32A and 32B and the motor supporting parts 34A and 34B, respectively. The cable bearings 36A and 36B guide of plural bending cables connected to the linear motors 20A and 20B and the linear scales 22A and 22B. The cable bearings 36A and 36B are provided on the cable supporting parts 37A and 37B extended in the Y direction. The cable bearings 36A and 36B prevent entwining of the cables due to movement of the bents following movement of the movable stage 18 in the Y direction.

The movable stage 18 is formed in a gate shape as seen in a front view. The movable stage 18 includes sliders 18A and 18B as movable parts and a beam 18C. The sliders 18A and 18B are driven by the linear motors 20A and 20B, respectively. The beam 18C bridges between the sliders 18A and 10B in an X direction perpendicular to the moving direction of the movable stage 18 so as to connect the sliders 18A and 18B.

A jig such as a coating nozzle (not shown in FIG. 1 through FIG. 4) or a sensor (not shown in FIG. 1 through FIG. 4) is provided at a front end or rear end of the beam 18C. The coating nozzle supplies chemical liquid to a surface of a substrate (not shown in FIG. 1 through FIG. 4) held on the substrate table 16. The sensor inspects the surface of the substrate.

Lifting driving parts 38A and 38B are provided on the sliders 18A and 18B, respectfully, so as to lift the beam 18c up and down in a Z direction.

Here, structures of the linear motors 20A and 20B and the guide parts 30A and 30B are discussed with reference to FIG. 3. Since the linear motors 20A and 20B and the guide parts 30A and 30B are bilaterally provided at left and right sides and have the same structures, only the linear motor 20B and the guide part 30B provided at a right side are discussed in the following explanation and explanations of the linear motor 20A and the guide part 30A are omitted.

As shown in FIG. 3 and FIG. 4, the linear motor 20B includes a coil supporting arm 40B, a movable coil 42B, a yoke 44B, and a permanent magnet 46B. The coil supporting arm 40B is projected to an outside of the slider 18B. The movable coil 42B is provided at upper and lower surfaces of the coil supporting arm 40B. The yoke 44B is supported at an upper end of the motor supporting part 34B. The permanent magnet 46B is fixed to an inside of the yoke 44B having a configuration of a rectangle not having one side. The movable coil 42B is provided so as to face the permanent magnet 46B. The movable coil 42B generates an electromagnetic force (driving force) in the Y direction against the permanent magnet 46B by the application of a driving voltage.

Therefore, by making the movable coil 42B generate an electromagnetic repulsion force or attraction force against the permanent magnet 46B, a driving force in the Y direction is given to the movable stage 18. By controlling the voltage applied to the movable coil 42B, it is possible to generate the driving force so that the movable stage 18 can run in the Y direction at a constant speed.

The guide part 30B includes a guide rail 50B, a slider 18B, a first static air bearing 52B, and a second static air bearing 54B. The guide rail 50B is extended in the Y direction. The slider 18B is formed so as to surround four sides of the guide rail 50B. The first static air bearing 52B supports the slider 18B vertically with an air cushion by jetting compressed air between the slider 18B and an upper surface 50B-1 of the guide rail 50B. The second static air bearing 54B supports the movable part 18B horizontally with an air cushion by jetting compressed air between the slider 18B and a right side surface 50B-2 of the guide rail 50B.

The slider 18B has guide surfaces 18B-1 through 18B-4 facing an upper surface 50B-1, a right side surface 50B-2, a lower surface 50B-3 and a left side surface 50B-4, respectively, of the guide rail 50B with minute gaps S. Therefore, the compressed air that is jetted into the gap S from the static air bearings 52B and 54B press the guide surfaces 18B-1 through 18B-4 of the slider 18B with a designated pressure. As a result of this, since the slider 18B is supported in a floating manner via the minute gaps S force away from the guide rail 50B, it is possible to move the slider 18B in the Y direction without contact and with almost no friction.

A linear scale 22B configured to detect a moving position of the movable stage 18 is provided at the right side surface 50B-2 of the guide rail 50B. The linear scale 22B includes a position detected plate 22a and a sensor 22B. The position detected plate 22a is extended in the Y direction. A number of slits of the position detected plate 22a are detected by the sensor 22b. Since the sensor 22B is provided at the slider 18B, it is possible to output the amount of movement of the movable stage 18 as a detection signal by using a pulse number corresponding to the number of the slits arranged in a line at a designated gap.

The linear motor 20A and the guide part 30A have the same structures as those of the linear motor 20B and the guide part 30B. Because of this, while the sliders 18A and 18B provided at left and right ends of the movable stage 18 are guided by the guide parts 30A and 30B, respectively, the movable stage 18 is driven in the Y direction by driving forces of the linear motors 20A and 20B. Therefore, the sliders 18A and 18B are simultaneously driven by the driving forces of the linear motors 20A and 20B so as to undergo translational movement. The beam 18C extending in the Y direction perpendicular to the moving direction of the movable stage 18B moves in the Y direction.

Figure 5:
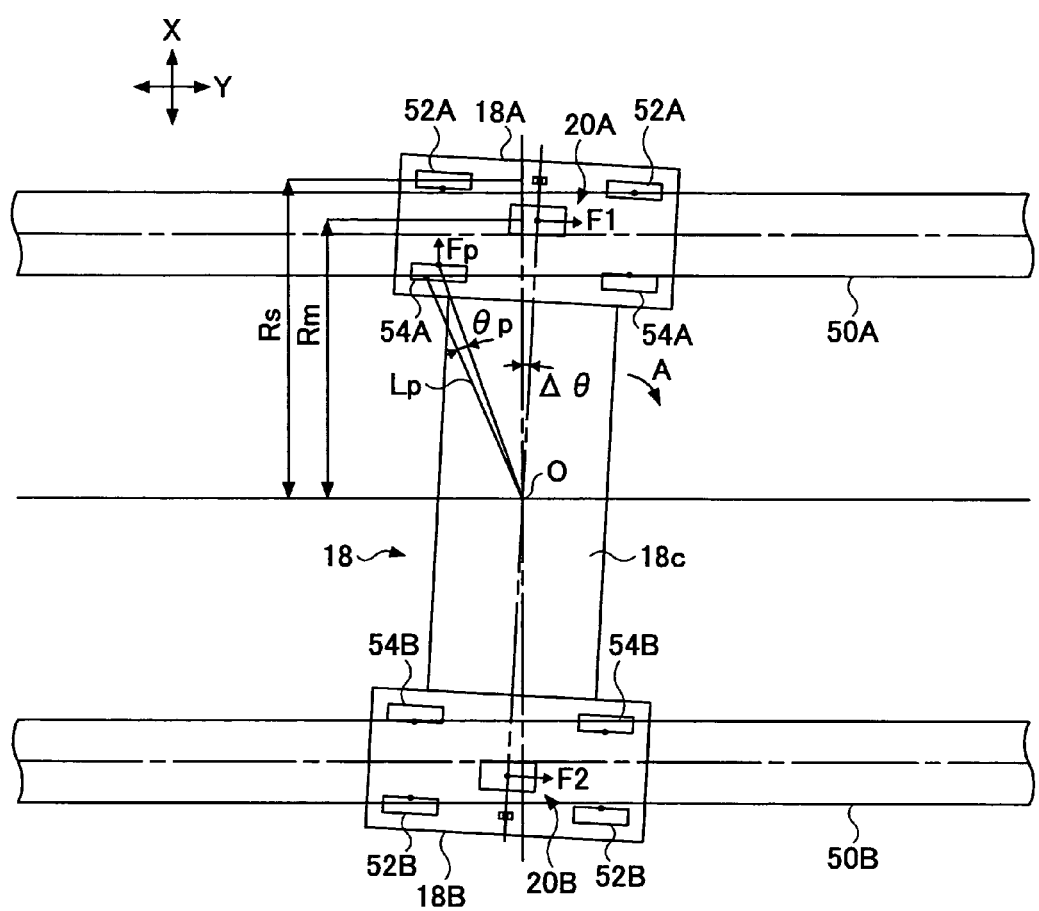
FIG. 5 is an enlarged plan view showing a moving state of a movable stage 18.

Here, a moving state (translational operation and rotational operation) of the movable stage 18 in the stage device 10 having the above-discussed structure is discussed with reference to FIG. 5. FIG. 5 is an enlarged plan view showing a moving state of the movable stage 18.

As shown in FIG. 5, the stage device 10 is feed-back controlled so that the liner motors 20A and 20B simultaneously generate driving forces. When disturbance is input, for example, torque change (torque ripple) of the linear motors 20A and 20B are generated, and the driving forces of the linear motors 20A and 20B are not the same. Alternatively, in the stage device 10, when loads of the cable bearings 36A and 36B are changed due to the moving position of the movable stage 10 being changed, loads applied to the linear motors 20A and 20B are not the same. As a result of this, due to changes of the driving forces of the linear motors 20A and 20B and the loads acting on the sliders 18A and 18B, the moving speeds of the sliders 18A and 19B become unstable so that a state where the sliders 18A and 18B cannot undergo translational movement is instantaneously generated.

If such a disturbance is input, the moving amount of both ends of the movable stage 18B are not equivalent so that the movable stage 18 is rotated in a direction indicated by an arrow A at a designated angle Δ θ wherein a center point O is the axis of the rotation. Because of this, the movable stage 18 cannot move in the Y direction in a state where inclination of the angle Δ θ against the X direction is formed.

Here, the inclination by the driving forces of the linear motors 20A and 20B of the movable stage 18 is defined as Δ θ. The inclination of the static air bearings 52B and 54B is defined as $\theta_p$. The distance between the center point O and the linear motor 20A is defined as $R_m$. The distance between the center point O and the static air bearings 54A and 54B is defined as $L_p$.

Furthermore, in the following explanation, the distance between the center point O and the static air bearings 52A and 52B is defined as $R_3$. The mass of the movable stage 18 is defined as M. Spring stiffness of the static air bearings 52A, 54A, 52B and 54B are defined as K. Coefficients of damping of the static air bearings 52A, 54A, 52B and 54B are defined as D. A rotational moment of the movable stage 18 is defined by I. Generation torques (Driving forces) of the linear motors 20A and 20B are defined as F. Torque displacement forces applied to the static air bearings 52A, 54A, 52B and 54B are defined as $F_p$.

Physical conditions of the movable stage 18 to be controlled are as follows.

(a) Angle θ information is obtained by translation of two points measurement using moving positions of the sliders 18A and 18B detected by the linear scales 22A and 22B.

(b) Driving force F information is obtained by a translation of two points driving way wherein driving forces $F_1$ and $F_2$ from the linear motors 20A and 20B are simultaneously acting.

(c) The sliders 18A and 18B are supported by four points of the static air bearings 52A, 54A, 52B and 54B, against the guide rails 50A and 50B of the guide parts 30A and 30B.

(d) Physical conditions necessary for a disturbance observer are led by the following points:

(d1) The mass M considers masses of the sliders (movable parts) 18A and 18B and the beam 18C;

(d2) The moment I considers rotational action of the beam 18C and the sliders 18A and 18B;

(d3) The spring constant K considers air pressure values of the static air bearings 52A, 54A, 52B and 54B;

(d4) The damper property D considers air pressure values of the static air bearings 52A, 54A, 52B and 54B; and (d5) PD (Proportional·Derivative) control laws are applied in a translational direction and the rotational direction, and the controls in the translational direction and the rotational direction can be adjusted without depending on a property of each control law and control conditions.

Here, equations of motion of object models are expressed by the following equations (1) through (4).

$$I\ddot{\theta} + D\dot{\theta} + K\theta = (F_1 - F_2)\frac{R_m}{L_p}\cos\theta_p \quad (1)$$

$$M\ddot{y} = F_1 + F_2 \quad (2)$$

$$y_1 = y + R_s\theta \quad (3)$$

$$y_2 = y - R_s\theta \quad (4)$$

In a case of a control system where the disturbance observer against a rotational direction (YAW direction) primary resonance model is applied, the equations of motion are expressed by the following equations (5) and (6).

$$d_\theta(s) = \frac{I's^2 D's + K'}{D_\theta(s)}\theta(s) - \frac{1}{D_\theta(s)}(F_1 - F_2)\frac{R_m}{L_p}\cos\theta_p \quad (5)$$

$$u'_\theta(s) = u_\theta(s) - d_\theta(s) \quad (6)$$

$$= u_\theta(s) - \left[\frac{I's^2 + D's + K'}{D_\theta(s)}\theta(s) - \frac{1}{D_\theta(s)}(F_1 - F_2)\frac{R_m}{L_p}\cos\theta_p\right]$$

In a case of a control system where the disturbance observer against a translation direction primary resonance model is applied, the equations of motion are expressed by the following equations (7) and (8).

$$d_y(s) = \frac{M's^2}{D_o(s)}y(s) - \frac{1}{D_o(s)}(F_1 + F_2) \quad (7)$$

$$u'_y(s) = u_y(s) - d_y(s) \quad (8)$$

$$= u_y(s) - \left[\frac{M's^2}{D_o(s)}y(s) - \frac{1}{D_o(s)}(F_1 + F_2)\right]$$

Here, a control system for controlling the driving forces of the linear motors 20A and 20B is discussed with reference to FIG. 6.

Figure 6:
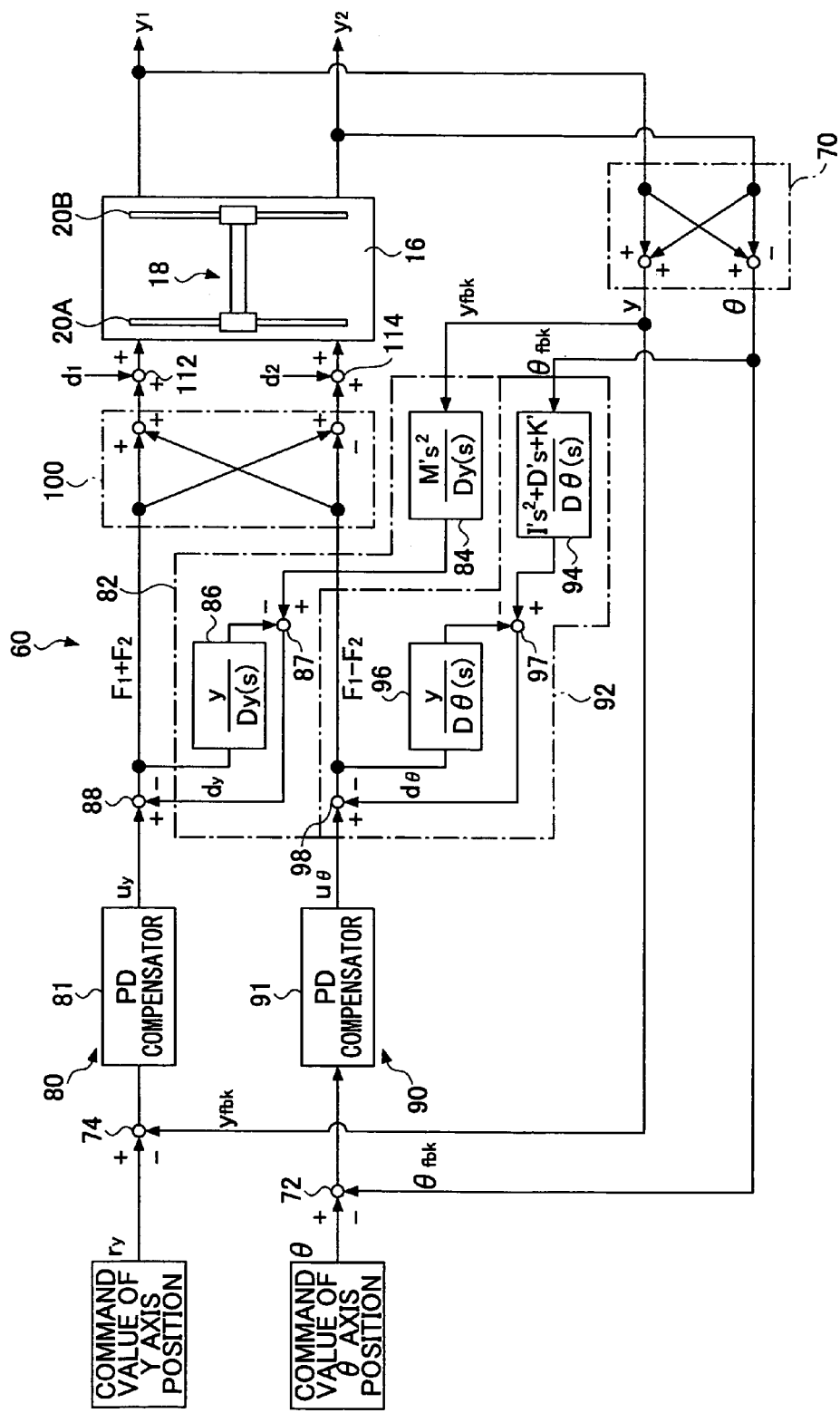
FIG. 6 is a system diagram showing a structure of a movable body position control device 60.

FIG. 6 is a system diagram showing a structure of a movable body position control device 60. As shown in FIG. 6, the movable body position control device 60 includes a coordinate conversion block 70, a translation direction control system (translation control part) 80, a yawing direction control system (rotation control part) 90, and a thrust incoherent block 100. The translation direction control system (translation control part) 80 feed-back controls a Y1 linear motor 20A. The yawing direction control system (rotation control part) 90 feed-back controls a Y2 linear motor 20B.

When position detection signals $y_1$ and $y_2$ of the sliders (movable parts) 18A and 18B detected by the linear scales 22A and 22B are input to the coordinate conversion block 70, the coordinate conversion block 70 makes coordinate conversion of the translation position from additional values "$y_1+y_2$" and inputs a feed-back signal $Y_{fbk}$ to the translation direction control system 80. In addition, the coordinate conversion block 70 makes coordinate conversion of an angle θ in the yawing direction (rotational direction) from subtractive values "$y_1-y_2$" of the position detection signals $y_1$ and $y_2$ and inputs a feed-back signal $\theta_{fbk}$ to the yawing direction control system 90. In a subtracter 74 of the translation direction control system (translation control part) 80, the value $Y_{fbk}$ that is coordinate-converted based on a Y axis position command value by the coordinate conversion block 70 is subtracted and this subtractive value is input to a PD compensator 81. Furthermore, in a subtracter 72 of the yawing direction control system 90, the value $\theta_{fbk}$ that is coordinate-converted based on a θ axis position command value by the coordinate conversion block 70 is subtracted and this subtractive value is input to a PD compensator 91.

In the PD compensators 81 and 91, control values $u_y$ and $u_\theta$ corresponding to input values $r_y$ and θ that are subtracted by the subtracters 72 and 74 are output as controls values to the linear motors 20A and 20B.

The stage translation direction control system 80 includes a translation disturbance observer 82. This translation disturbance observer 82 estimates displacement change of the sliders 18A and 18B due to the disturbance and corrects the amount of control to the liner motors 20A and 20B so that the estimated displacement difference becomes zero.

In other words, the translation disturbance observer 82 includes an input torque estimating filter 84, a low-pass filter 86 and a subtracter 87. The feed-back signal $y_{fbk}$ is input from the coordinate conversion block 70 to the input torque estimating filter 84. The low-pass filter 86 forms a feed-back loop. In the subtracter 87, a correction value from the low-pass filter 86 is subtracted from the estimated value from the input torque estimating filter 84. In addition, a corrected disturbance estimated value $d_y$ is input to a subtracter 88 of the translation direction control system 80. Subtraction by using the control value $u_y$ from the PD compensator 81 is made so that control values "$F_1+F_2$" where estimated disturbance elements corresponding to the stage translation action are removed are generated.

The yawing direction control system 90 includes an rotation disturbance observer 92. This rotation disturbance observer 92 estimates a rotational angle θ of the movable stage 18 by the disturbance and corrects the amount of control to the liner motors 20A and 20B so that the estimated rotational angle θ becomes zero.

In other words, the rotation disturbance observer 92 includes an input torque estimating filter 94, a low-pass filter 96, and an subtracter 97. The feed-back signal $\theta_{fbk}$ is input from the coordinate conversion block 70 to the input torque estimating filter 94. The low-pass filter 96 forms a feed-back loop. In the subtracter 97, a correction value from the low-pass filter 96 is subtracted from the estimated value from the input torque estimating filter 94. In addition, a corrected disturbance estimated value $d_\theta$ is input to a subtracter 98 of the yawing direction control system 90. Subtraction by using the control value $u_\theta$ from the PD compensator 91 is made so that control values "$F_1-F_2$" where estimated disturbance elements corresponding to the stage rotational action are removed are generated.

The thrust incoherent block 100 converts the Y direction translation thrust command value and θ direction thrust command value corrected by the translation disturbance observer 82 and the rotational disturbance observer 92 to thrust command values $F_1$ and $F_2$ of the linear motors 20A and 20B. A translation direction disturbance $d_1$ and a rotational direction disturbance $d_2$ input against the sliders 18A and 18B are input to the thrust command values $F_1$ and $F_2$ that are output from the thrust incoherent block 100, by adders 112 and 114.

However, the estimated disturbance elements are removed from the above-mentioned Y direction translation thrust command value and the θ direction thrust command value by the translation disturbance observer 82 and the rotational disturbance observer 92. Therefore, the linear motors 20A and 20B can generate the driving forces $F_1$ and $F_2$ having no influence of the translation direction disturbance $d_1$ and the rotational direction disturbance $d_2$.

As a result of this, even if the translation direction disturbance $d_1$ and the rotational direction disturbance $d_2$ are input, translational action in the Y direction of the sliders 18A and 18B can be stably performed without the rotational action shown in FIG. 5, namely inclination in the direction indicated by the arrow A is prevented.

Therefore, in the stage device 10, even if the translation direction disturbance $d_1$ and the rotational direction disturbance $d_2$ are input, the rotational force does not act on the movable stage 18. While the extending direction of the movable stage 10 is corrected to be the X direction perpendicular to the moving direction, it is possible to translation-drive the both ends of the movable stage 18 at a constant speed.

In addition, the driving forces of the linear motors 20A and 20B can be controlled so that the movable stage 18 does not lean due to the translation disturbance observer 82 and the rotational disturbance observer 92. Therefore, it is possible to attenuate the change of the movable stage 19 in an instant so that the moving speed can be stable. Accordingly, it is possible to achieve high sensing precision or high processing precision corresponding to a jig installed in the movable stage 18.

Thus, according to the embodiments of the present invention, it is possible to provide a movable body position control device configured to control a pair of driving parts, the driving parts being configured to drive both ends of a movable body based on a detection signal from a pair of position detectors configured to detect moving positions of the both ends of the movable body, the movable body position control device including: a translation control part configured to make the driving parts generate a driving force whereby a difference of translational action of the movable body is prevented in a case where a moving speed of the movable body is changed due to a disturbance, and configured to control the driving parts so that detected positions of the position detectors are consistent with each other; and a rotation control part configured to make the driving parts generate a driving force whereby a rotational action of the movable body is prevented in a case where the moving speed of the movable body is changed due to the disturbance and the movable body is displaced in a rotational direction, and configured to control the driving parts so that the moving body does not lean against a moving direction.

In the above-mentioned movable body position control device, the translation control part may include a feed-back system configured to control the driving parts based on a detection signal from the position detectors and controls the driving parts so that a difference of amounts of displacement between the both ends of the movable body due to the disturbance becomes zero. The translation control part may include a feed-back system configured to control the driving parts based on a detection signal from the position detectors and controls the driving parts so that a rotational angle of the movable body against a direction perpendicular to the moving direction due to the disturbance becomes zero.

The translation control part may include a disturbance observer whereby a difference of change between the both ends of the movable body due to the disturbance is estimated and control amounts for the driving parts are corrected so that the estimated difference of change becomes zero.

In the above-mentioned movable body position control device, the rotation control part may estimate a change of the moving speed due to the disturbance, and controls the control parts so that a rotational angle of the movable body against a direction perpendicular to the moving direction becomes zero. The rotation control part may include a disturbance observer whereby a rotational angle of the movable body due to the disturbance is estimated, and a control amounts for the driving parts are corrected so that the estimated rotational angle becomes zero.

The translation control part may include a disturbance observer whereby a difference of change between the both ends of the movable body due to the disturbance is estimated and control amounts for the driving parts are corrected so that the estimated difference of change becomes zero. The rotation control part includes a disturbance observer whereby a rotational angle of the movable body due to the disturbance is estimated, and a control amounts for the driving parts are corrected so that the estimated rotational angle becomes zero.

According to the embodiments of the present invention, it is possible to provide a stage device, including: a fixed base; a stage movably provided against the fixed base and extending in a direction perpendicular to a moving direction; a guide part configured to guide both ends of the stage in the moving direction; a pair of driving parts configured to give a driving force to the both ends of the stage; a pair of position detectors configured to detect moving positions of the both ends of the stage; and a control part configured to control the driving parts so that the stage moves at a designated speed; wherein the control part includes a translation control part configured to make the driving parts generate a driving force whereby a difference of translation actions of the stage is prevented in a case where a moving speed of the stage is changed due to a disturbance, and configured to control the driving parts so that detected positions of the position detectors are consistent with each other; and a rotation control part configured to make the driving parts generate a driving force whereby a rotational action of the stage is prevented in a case where the moving speed of the stage is changed due to the disturbance and the stage is displaced in a rotational direction, and configured to control the driving parts so that the stage does not lean against a moving direction.

In the above-mentioned stage device, the guide part may be provided between the both ends of the stage and the fixed base and guides the both ends of the stage by an air pressure at a low friction. The driving parts may be linear motors extending in the moving direction of the stage and giving a driving force in the moving direction to the both ends of the stage. The translation control part may include a disturbance observer whereby a difference of change between the both ends of the movable body due to the disturbance is estimated and control amount for the driving parts are corrected so that the estimated difference of change becomes zero. The rotation control part may estimate the change of the moving speed due to the disturbance, and controls the control parts so that a rotational angle of the movable body against a direction perpendicular to the moving direction becomes zero.

As discussed above, the translation control part makes the driving parts generate the driving force whereby the difference of the translation action of the movable body (stage) is prevented in the case where the moving speed of the movable body (stage) is changed due to disturbance; the rotation control part makes the driving parts generate the driving force whereby the rotational action of the movable body (stage) is prevented in the case where the moving speed of the movable body (stage) is changed due to disturbance and the movable body (stage) is displaced in the rotational direction; and thereby the extending direction of the movable body (stage) is maintained perpendicular to the moving direction. Therefore, even if the rotational force acts on a movable body (stage) due to input of the disturbance, while the movable body (stage) is corrected to remain in the direction perpendicular to the moving direction, it is possible to drive the both ends of the movable body (stage) at the constant speed.

As discussed above, by the translation control part, the difference of the changes of the both ends of the movable body (stage) due to the disturbance is estimated and the control amount for the driving parts are corrected so that the estimated difference of change becomes zero. In addition, by the rotation control part, the rotational angle of the movable body due to the disturbance is estimated and the control amounts for the driving parts are corrected so that the estimated rotational angle becomes zero.

Therefore, it is possible to correct the driving force so that the moving body (stage) does not lean and to attenuate the change of the movable body (stage) in an instant so that the moving speed can be stable. Accordingly, it is possible to achieve high sensing precision or high processing precision corresponding to a jig installed in the movable body (stage).

The present invention is not limited to these embodiments, but variations and modifications may be made without departing from the scope of the present invention.

In the above-discussed embodiments, a device having the structure where the sliders 18A and 18B are uniformly connected to both ends of the beam 18C is explained. However, the present invention is not limited to this structure. For example, the sliders 18A and 18B and both ends of the beam 18C may be connected via an elastic member such as a plate spring so that the sliders 18A and 18B can be oscillated.

Furthermore, in the above-discussed embodiments, the movable stage 18 of the stage device is translation acted. However, the present invention is not limited to this structure. For example, as long as a pair of driving parts are controlled, the driving parts being configured to drive the vicinities of the both ends of the movable body based on a detection signal from a pair of the position detectors for detecting moving positions of the vicinities of the both ends of the movable body, the present invention can be applied to a device used in a different technical field.

What is claimed is:

1. A movable body position control device, comprising:
a pair of position detectors configured to detect moving positions of both ends of a movable body;
a pair of driving parts, the driving parts being configured to drive the both ends of the movable body based on a detection signal from the pair of the position detectors;
a translation control part configured to make the driving parts generate a driving force whereby a difference of translational action of the movable body is prevented in a case where a moving speed of the movable body is changed due to a disturbance, and configured to control the driving parts so that detected positions of the position detectors are consistent with each other; and
a rotation control part configured to make the driving parts generate the driving force whereby a rotational action of the movable body is prevented in a case where the moving speed of the movable body is changed due to the disturbance and the movable body is displaced in a rotational direction, and configured to control the driving parts so that the moving body does not lean against a moving direction.

2. The movable body position control device as claimed in claim 1,
wherein the translation control part includes a feed-back system configured to control the driving parts based on the detection signal from the position detectors and controls the driving parts so that a difference of amounts of displacement between the both ends of the movable body due to the disturbance becomes zero.

3. The movable body position control device as claimed in claim 2,
wherein the rotation control part includes a feed-back system configured to control the driving parts based on the detection signal from the position detectors and controls the driving parts so that a rotational angle of the movable body against a direction perpendicular to the moving direction due to the disturbance becomes zero.

4. The movable body position control device as claimed in claim 2,
wherein the translation control part includes a disturbance observer whereby a difference of change between the both ends of the movable body due to the disturbance is estimated and control amounts for the driving parts are corrected so that estimated difference of change becomes zero.

5. The movable body position control device as claimed in claim 1,
wherein the rotation control part estimates a change of the moving speed due to the disturbance, and controls the control parts so that the rotational angle of the movable body against the direction perpendicular to the moving direction becomes zero.

6. The movable body position control device as claimed in claim 5,
wherein the rotation control part includes the disturbance observer whereby the rotational angle of the movable body due to the disturbance is estimated, and the control amounts for the driving parts are corrected so that an estimated rotational angle becomes zero.

7. The movable body position control device as claimed in claim 3,
wherein the translation control part includes the disturbance observer whereby the difference of change between the both ends of the movable body due to the disturbance is estimated and the control amounts for the driving parts are corrected so that the estimated difference of change becomes zero.

8. The movable body position control device as claimed in claim 7,
wherein the rotation control part includes the disturbance observer whereby the rotational angle of the movable body due to the disturbance is estimated, and the control amounts for the driving parts are corrected so that the estimated rotational angle becomes zero.

9. A stage device, comprising:

a fixed base;

a stage movably provided against the fixed base and extending in a direction perpendicular to a moving direction;

a guide part configured to guide both ends of the stage in the moving direction;

a pair of driving parts configured to give a driving force to the both ends of the stage;

a pair of position detectors configured to detect moving positions of the both ends of the stage; and a control part configured to control the driving parts so that the stage moves at a designated speed;

wherein the control part includes a translation control part configured to make the driving parts generate the driving force whereby a difference of translation actions of the stage is prevented in a case where a moving speed of the stage is changed due to a disturbance, and configured to control the driving parts so that detected positions of the position detectors are consistent with each other; and a rotation control part configured to make the driving parts generate the driving force whereby a rotational action of the stage is prevented in a case where the moving speed of the stage is changed due to the disturbance and the stage is displaced in a rotational direction, and configured to control the driving parts so that the stage does not lean against the moving direction.

10. The stage device as claimed in claim 9, wherein the guide part is provided between the both ends of the stage and the fixed base and guides the both ends of the stage by an air pressure at a low friction.

11. The stage device as claimed in claim 9, wherein the driving parts are linear motors extending in the moving direction of the stage and giving the driving force in the moving direction to the both ends of the stage.

12. The stage device as claimed in claim 9, wherein the translation control part includes a disturbance observer whereby a difference of change between the both ends of the stage due to the disturbance is estimated and control amount for the driving parts are corrected so that the estimated difference of change becomes zero.

13. The stage device as claimed in claim 9, wherein the rotation control part estimates the change of the moving speed due to the disturbance, and controls the control parts so that a rotational angle of the stage against the direction perpendicular to the moving direction becomes zero.

* * * * *